US008365291B1

United States Patent
Le et al.

(10) Patent No.: US 8,365,291 B1
(45) Date of Patent: Jan. 29, 2013

(54) BROWSER EXTENSION CONTROL FLOW GRAPH BASED TAINT TRACKING

(75) Inventors: Minh Thoai Anh Le, Santa Ana, CA (US); Andrew Swerdlow, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/298,005

(22) Filed: Nov. 16, 2011

(51) Int. Cl.
*H04L 29/06* (2006.01)
(52) U.S. Cl. .......................................................... 726/25
(58) Field of Classification Search ...................... 726/25
See application file for complete search history.

(56) References Cited

U.S. PATENT DOCUMENTS

| 6,269,330 | B1 * | 7/2001 | Cidon et al. ................... 714/43 |
| 7,284,274 | B1 | 10/2007 | Walls et al. |
| 2004/0085366 | A1 * | 5/2004 | Foster et al. ................... 345/854 |
| 2009/0178031 | A1 | 7/2009 | Zhao |
| 2009/0287734 | A1 | 11/2009 | Borders |
| 2011/0167474 | A1 | 7/2011 | Sinha et al. |
| 2011/0197180 | A1 | 8/2011 | Huang et al. |
| 2011/0252475 | A1 | 10/2011 | Mui et al. |
| 2011/0302566 | A1 | 12/2011 | Abadi et al. |
| 2011/0307951 | A1 | 12/2011 | Yermakov et al. |

OTHER PUBLICATIONS

Bandhakavi, S. et al., "Vetting Browser Extensions for Security Vulnerabilities with VEX," *Communications of the ACM*, vol. 54, No. 9, pp. 91-99 (Sep. 2011).

* cited by examiner

*Primary Examiner* — Brandon Hoffman
*Assistant Examiner* — Michael D Anderson
(74) *Attorney, Agent, or Firm* — Sterne, Kessler, Goldstein & Fox PLLC (57) ABSTRACT

A computer-implemented method, a system and a computer program product for determining whether a browser extension leaks information over a network, is provided. A control flow graph (CFG) is generated from a source code included in the browser extension. The CFG is particular to the programming language included in the source code. A sensitive path in the CFG is determined. The sensitive path begins at a sensitive source node and ends at a sensitive end node. A set of tainted variables in the CFG are identified, where each tainted variable stores sensitive information. A subset of tainted variables is generated, where each tainted variable in the subset is included in the sensitive path. When a tainted variable in the subset is included in the sensitive end node it is associated with a leak of sensitive information by the browser extension over the network.

20 Claims, 4 Drawing Sheets

BROWSER EXTENSION CONTROL FLOW GRAPH BASED TAINT TRACKING

BACKGROUND

As browser extensions become commonplace, users download browser extensions to their computing devices. On the computing devices, browser extensions are incorporated into a browser and provide a user with desired applications or services. When browser extensions are incorporated into a browser, they gain access to the memory space associated with the browser and to data content that belongs to a user using the computing device.

Although the majority of browser extensions are harmless, some browser extensions access sensitive and/or personal information of a user, such as the user's browsing history, cookies and bookmarks. Some browser extensions may also be designed to transmit this information to a third party, without the knowledge or consent of the user.

When a browser extension is downloaded to a client device, a browser does not check whether a browser extension accesses and transmits user's personal and sensitive information to a third party. By downloading a browser extension to a client device and running the extension, a user may unknowingly release his or her personal or sensitive information to outside parties.

BRIEF SUMMARY

Embodiments of the invention include a computer-implemented method, a system and a computer program product for determining whether a browser extension leaks information over a network, is provided. A control flow graph (CFG) is generated from a source code included in the browser extension. A sensitive path in the CFG is determined. The sensitive path begins at a sensitive source node and ends at a sensitive end node. A set of tainted variables in the CFG are identified, where each tainted variable stores sensitive information. A subset of tainted variables is generated where each tainted variable in the subset is included in the sensitive path. When a tainted variable in the subset is included in the sensitive end node, the tainted variable is associated with a leak of information by the browser extension over the network.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Figure 1:
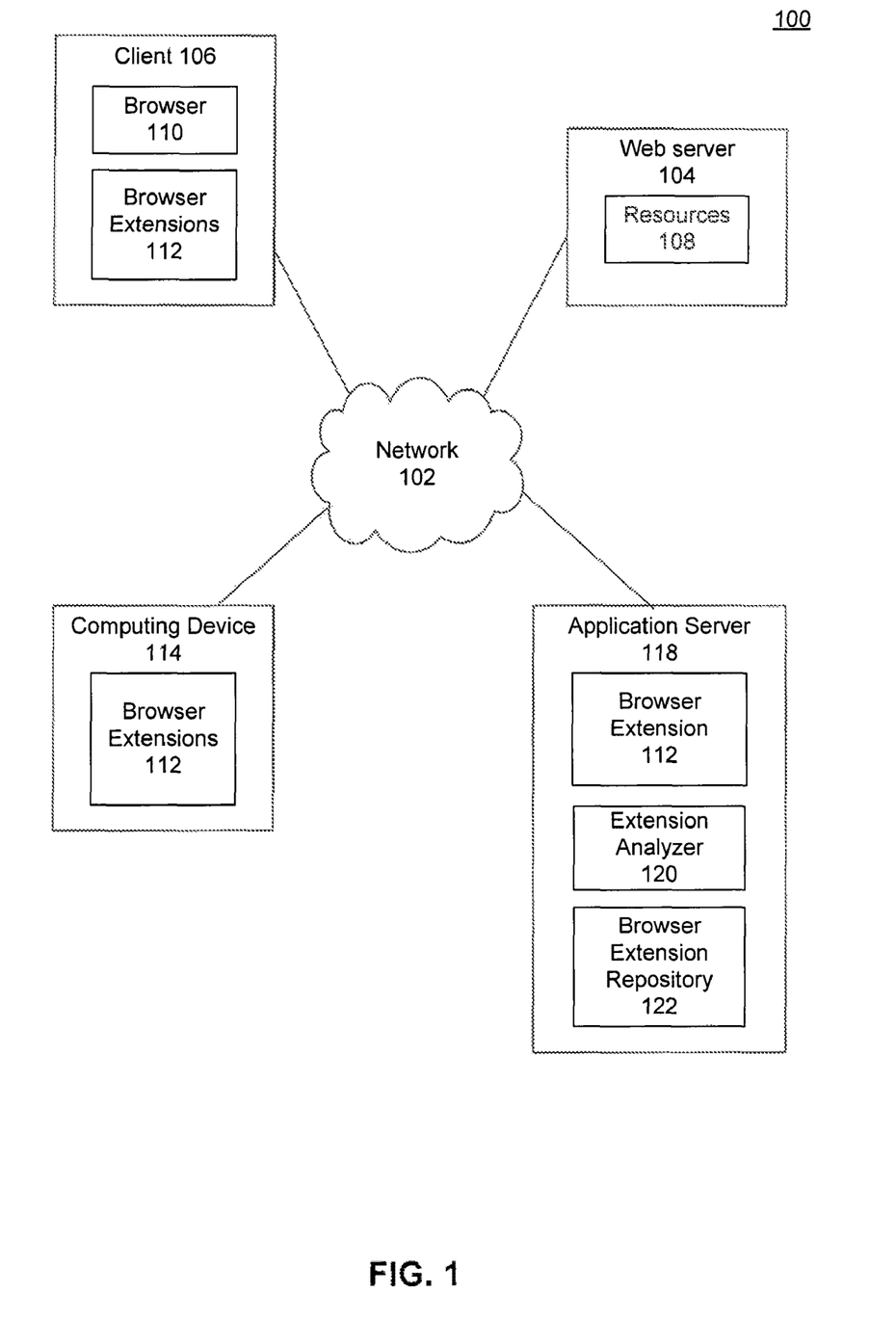
FIG. 1 is a block diagram showing a client-server system in which embodiments of the invention can be implemented.

FIG. 1 is a block diagram of a client-server environment 100. Client-server environment 100 includes one or more networks 102, web servers 104, clients 106, computing devices 114, and application servers 118.

Network 102 may be any network or combination of networks that can carry data communication. Such a network 102 may include, but is not limited to, a local area network, metropolitan area network, and/or wide area network such as the Internet. Network 102 can support protocols and technologies including, but not limited to, World Wide Web (or simply the "Web"), protocols such as a HyperText Transfer Protocol ("HTTP") protocols, and/or services. Intermediate web servers, gateways, or other servers may be provided between components of the system shown in FIG. 1, depending upon a particular application or environment.

Web server 104 is a computing device or an application executing on a computing device that hosts resources 108. Resources 108 are associated with a domain name and hosted by one or more web servers 104. Web server 104 helps deliver resources 108 to clients 106. Resource 108 is any data that can be provided over network 102. Resource 108 is identified by a resource address that is associated with each resource 108. Resources 108 include hypertext markup language (HTML) pages, word processing documents, and portable document format (PDF) documents, images, video, and feed sources, to name only a few. Resources 108 can include content, such as words, phrases, images and sounds, that may include embedded information (such as meta-information in hyperlinks) and/or embedded instructions (such as JavaScript scripts).

Client 106 is an electronic device that is manipulated by a user and is capable of requesting and receiving resources 108 over network 102. Example clients 106 are personal computers, mobile communication devices, and tablet computers. Client 106 includes an application, such as a web browser (or simply browser) 110. A user uses browser 110 to request resources 108 over network 102. For example, a user requests resource 108 by typing the resource address associated with resource 108 that is stored on web server 104. In response to the request, web server 104 delivers resources 108 to client 106. When client 106 receives resources 108 from web server 104, client 106 uses browser 110 to display resources 108 to the user.

Browser 110 may also include a browser extension 112. Browser extension 112 is an application that extends a functionality of browser 110 by, for example, adding a user interface for a particular resource 108. Browser extension 112 is also known as a "browser plug-in" or a "browser add-on." Browser extension 112 adds functionality to browser 110. Example browser extensions 112 may include extensions for resources 108 that provide an online dictionary, online photo-sharing sites, online email, and online translator on client 106.

Browser extension 112 may be downloaded from web server 104 or application server 118 and installed on client 106 as part of browser 110.

Browser extension 112 is developed by an application developer on computing device 114. Computing device 114 may be the same or different device as client 106. An application developer uses a scripting language, such as, JavaScript to develop browser extension 112 on computing device 114. When a developer completes developing browser extension 112, a developer uploads browser extension 112 to an application server 118 for distribution.

Application server 118 distributes browser extension 112 to clients 106. Typically, a user uses client 106 to request a particular browser extension 112 from application server 118. In response, application server 118 downloads browser extension 112 onto client 106.

When browser extension 112 is downloaded onto client 106, browser extension 112 becomes integrated with browser 110. As part of browser 110, browser extension 112 gains access to sensitive sources that include personal and sensitive information of a user. Because browser extension 112 may use the sensitive source to access personal and sensitive information of a user, some browser extensions 112 may attempt to transmit the accessed information to a third party, without the user's knowledge or consent.

The sensitive sources may be any of several types. One example of a sensitive source may be an HTML form that includes an interface for direct input from a user. Other examples of sensitive sources are files that contain cookie history, browser bookmarks, user preferences and saved passwords. Another example is a sensitive source that includes information about behavior of a user, such as, user's mouse clicks, touch screen movement, scrolling actions, etc. Another example of a sensitive source is the HTML data that was acquired through a secure connection, such as data that includes comments generated by users visiting blogs or social networking websites, banking information, etc. Another example of a sensitive source is data acquired from resources 108 that may be accessed using a secure login. This data may be collected by a background application or through an affirmative consent of a user. Another example of a sensitive source a Unified Resource Locator (URL) that access resources 108. The personal and sensitive information of a user may be included in the URL string stored on client 106 and may be extracted using a parsing function.

To prevent a user from downloading browser extension 112 that spreads user's personal and sensitive information over network 102, application server 118 includes an extension analyzer. Extension analyzer 120 analyzes browser extension 112 and determines whether browser extension 112 accesses the sensitive information of a user and transmits the accessed information to a third party. When an application developer uploads browser extension 112 to application server 118, extension analyzer 120 analyzes browser extension 112 before browser extension 112 is distributed to clients 106. For example, extension analyzer 120 analyzes uploaded browser extensions 112 at preconfigured time intervals, such as each day, once a week, when browser extension 112 is uploaded, etc.

In an embodiment, when extension analyzer 120 verifies that browser extension 112 does not transmit sensitive and personal information of a user to a third party, application server 118 stores the verified browser extension in an extension repository 122. Extension repository 122 may be implemented as a database, or another volatile or non-volatile storage medium discussed in detail in FIG. 7.

However, when extension analyzer 120 determines that browser extension 112 accesses and transmits the personal and sensitive information of a user over network 102, application server 118 may delete browser extension 112 and, in an embodiment, send a message to an application developer that browser extension 112 will not be stored or distributed by application server 118.

In another embodiment, extension analyzer 120 may be downloaded to client 106 (not shown). In this embodiment, extension analyzer 120 may be included as a plug-in or extension to browser 110. When client 106 downloads browser extensions 112 to client 106, extension analyzer 120 verifies that the downloaded browser extension 112 is not malicious and does not leak personal and sensitive information of the user. Once extension analyzer 120 verifies that browser extension 112 is not malicious, client 106 installs browser extension 112 on client 106. Otherwise, client 106 may delete the downloaded browser extension 112.

In yet another embodiment, extension analyzer 120 may also be included on computing device 114 (not shown).

In yet another embodiment, extension analyzer 120 may be installed on a server that acts as an application store (not shown). The application server includes applications, such as, browser extensions 112 that may be purchased or downloaded for free. A user using client 106 may connect to the application store and purchase or select browser extension 112 for download. In this embodiment, extension analyzer 120 analyzes browser extensions 112 that the application store offers for sale or for a free download before those browser extensions 112 may be downloaded to client 106.

Figure 2:
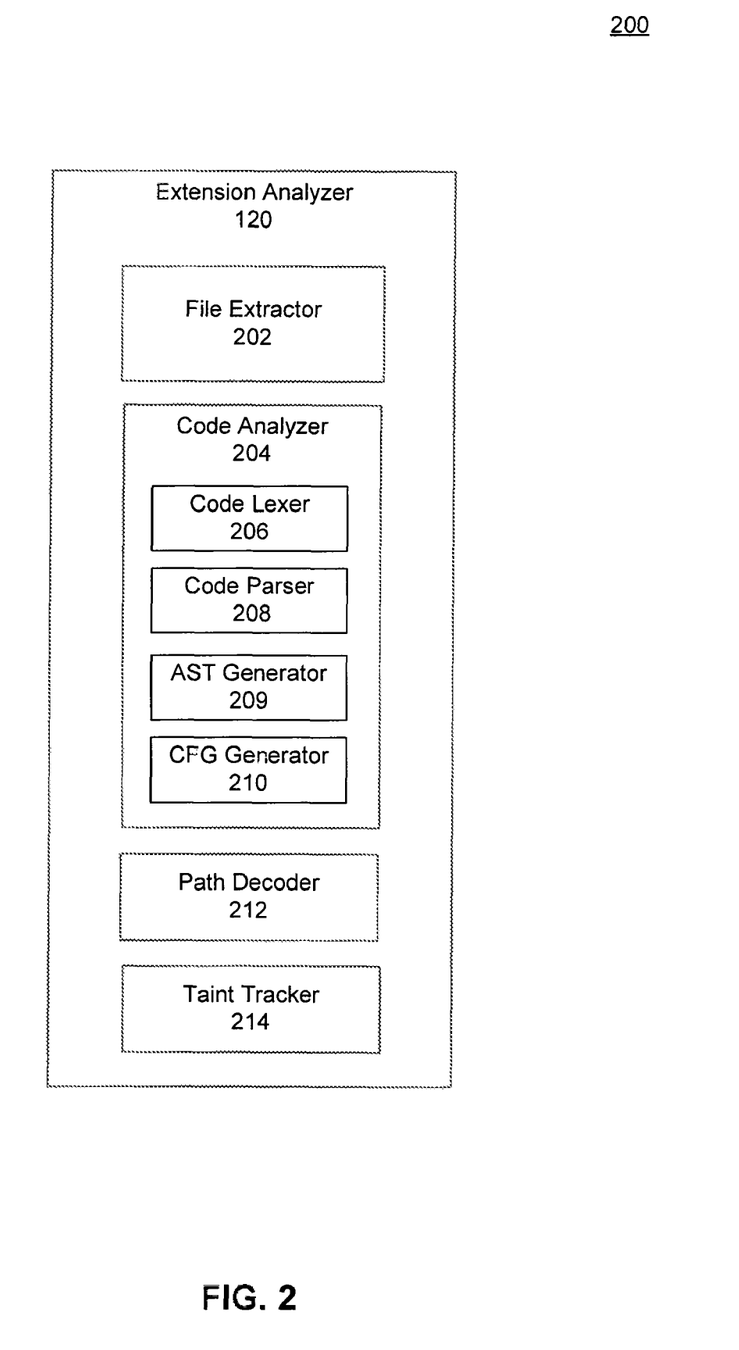
FIG. 2 is a block diagram of an exemplary extension analyzer, according to an embodiment.

FIG. 2 is a block diagram 200 of an exemplary extension analyzer. The purpose of the extension analyzer is to determine when browser extension 112 transmits personal or sensitive information of a user to third parties. In an embodiment, extension analyzer 120 analyzes browser extensions 112 that are written in a scripting language, such as JavaScript, although a browser extension 112 may be designed to analyze source code in any programming language.

In an embodiment, when browser extension 112 is transmitted to application server 118, browser extension 112 is transmitted as a browser extension package. A browser extension package may be in a ZIP file format, and facilitates the transmission of source code files, metadata files, configuration files, resources (such as images, texts, etc.), that are necessary to execute browser extension 112 on client 106. In an embodiment, application server 118 may receive a browser extension package in a Java Archive (JAR) format or other data compression and archive file format.

Extension analyzer 120 includes a file extractor 202, a code analyzer 204, a path decoder 212 and a taint tracker 214. To determine whether browser extension 112 accesses and transmits personal and sensitive information of a user, extension analyzer 120 analyzes browser extension files that include source code.

File extractor 202 extracts files from browser extension package that includes browser extension 112. In an embodiment, browser extension package includes a manifest file. The manifest file includes information such as the title, version and build data of browser extension 112, and a location and path to source code files that are included in the browser extension package. To extract source code files, file extractor 202 accesses the manifest file and retrieves a listing of files that include source code, in one embodiment. In another embodiment, file extractor 202 scans file extensions of the files included in browser extension package and identifies files with an extension specific to a source code file.

After file extractor 202 identifies the source code files, code analyzer 204 analyzes each source code file. Code analyzer 204 constructs a control flow graph (CFG) of the source code. A CFG provides a visual representation of a control flow of a computer program. For example, the source code in the computer program may branch off and pass control of a computer program from one function to another function. In another example, the control may return to the first function. Typically, a computer program may branch off and return by executing a series of functions or procedure calls. The control flow of the program may determine the functions or procedures that access personal and sensitive information of a user. The control flow of a program may also determine functions or procedures that transmit and receive content over network 102.

To construct a CFG, code analyzer 204 uses a code lexer 206, a code parser 208, an abstract syntax tree (AST) generator 209 and a CFG generator 210.

Code lexer 206 performs a lexical analysis on the source code. Code lexer 206 uses the lexical analysis to understand each word in the source code. Example words in source code may include control words, action words and variables. The control words are specific to a particular programming language that an application developer uses to develop an application. Control words determine the flow of browser extension 112 as the source code is being executed. Example control words in a JavaScript may include "if", "else", "for", "case", "switch", "default", "break", etc., to name only a few. A person skilled in the art will appreciate that control words are reserved for a particular programming language, and may not be used or overloaded with other words.

In one embodiment, code lexer 206 may perform a lexical analysis using a word tokenizer. The word tokenizer may receive a string from the source code as input, and break the string into multiple words or tokens, using, for example, a space as a delimiter. A string may include characters in one line of source code, in one embodiment.

Code lexer 206 then extracts the known tokens (or words) that were preconfigured by the code lexer 206 developer. Those preconfigured tokens may include control words that are specific to a particular programming language.

Code parser 208 includes logic that groups tokens structurally. For example, code parser 208 groups control statements that include control words and programming language instructions that may be in the vicinity of each control word identified by code lexer 206. Code parser 208 also analyzes where the control statement begins, where it ends, the meaning of each control statement, whether the control statement transfers control from one function to another function based on a condition, returns control to the original function, etc.

For example, in the source code statement:

if var v=(x>1) f(a):f(b)

code lexer 206 identifies control words, such as "if". Code parser 208 analyzes the control statement that is associated with the "if" control word. For example, code parser 208 determines that if the first expression (x>1) is true, variable "v" is set to the second expression (v=f(a)), but if the first expression is false, "v" is set to the third expression (v=f(b)). Thus for each of the control statements, code parser 208 includes logic that analyzes the behavior of the program. The logic that code parser 208 uses to analyze control statements may be specific to a programming language.

Abstract syntax tree generator (AST generator) 209 generates an abstract syntax tree (AST) from the source code statements that are identified using code lexer 206 and code parser 208. AST includes AST nodes that contain a concise representation of the instruction logic included in the source code. A person skilled in the art will appreciate that an AST representation may be different for each programming language, and may depend on the control words and programming instructions that are specific to each programming language. A person skilled in the art will further appreciate that an AST may not include every detail that is present in the source code (as they are implicit in the AST), such as, in a non-limiting example, commas, brackets, parenthesis, semicolons, etc. In an embodiment, AST generator 209 may build an AST using Another Tool for Language Recognition (ANTLR), which is known to a person skilled in the relevant art. A person skilled in the art will further appreciate that another structure may be built to analyze the control flow of the source code included in browser extension 112.

CFG generator 210 generates a CFG from the AST generated by AST generator 209. In one embodiment, CFG generator 210 traverses the AST tree to generate a CFG, using, in a non-limiting example, a pre-order traversal. A person of ordinary skill in the art will appreciate, that in a pre-order traversal, CFG generator 210 may access a parent node in the AST and then the child nodes, such as the leftmost child node and continuing to the rightmost child node of each parent node. Other types of traversals, such as an in-order traversal and a post-order traversal may also be used.

The CFG represents a control flow of each source code statement. For example, as CFG generator 210 traverses each node in the AST, CFG generator generates a CFG node from the content included in one or more AST nodes.

Once CFG nodes are determined, CFG generator 210 connects the nodes, using, for example, edges. The order that CFG generator 210 connects CFG nodes may depend on the order in which CFG generator 210 traverses the AST or the recognized programming instructions included in the AST node. The edges represent the control flow between each node in the CFG. Each CFG includes an entry node and an exit node. The entry node represents the node within CFG where the control flow begins, whereas the exit node represents a node in the CFG where the control flow ends.

An example CFG from the source code statement above is reproduced below:

Thus, for each source code statement, code parser 208 uses the instruction logic to determine the number of nodes that CFG generator 210 generates and the connections between each node. CFG generator 210 then connects the individual CFGs that represent a control flow of each statement into a CFG that represents the control flow of browser extension 112.

In an embodiment, a type and version of browser 110 may influence the CFG construction. For example, the source code statements in the source code files may be particular to browser 110 of a particular type, and may influence the way code lexer 206 and code parser 208 interpret the source code statements. This, in turn may influence the generation of a CFG by CFG generator 210.

Path decoder 212 determines whether a sensitive path exists in the CFG. The sensitive path represents a potential leakage of sensitive and personal information of a user over network 102. When path decoder 212 finds a sensitive path, there is a potential for leakage of sensitive information. To determine whether the leakage is real, the source code is analyzed in greater detail.

The sensitive path begins with the nodes in the CFG that include source coded that accesses personal and sensitive information, also referred to as "sensitive source nodes". Example sensitive source nodes are the nodes that include source code which accesses and retrieves browser bookmarks, cookies or a browsing history of a user.

The sensitive path ends with the nodes that access network 102, also referred to as "sensitive end nodes." For example sensitive end nodes access network 102 or include source code that implements an I/O interface. After path decoder 212 identifies sensitive source nodes and sensitive end nodes, path decoder 212 traverses a CFG and identifies whether a sensitive path exists from the sensitive source nodes to the sensitive end nodes.

When path decoder 212 determines that a sensitive path exists from the sensitive source node to the sensitive end node, path decoder 212 identifies a potential leakage of the sensitive and/or personal information of a user by browser extension 112. When the sensitive path exists in browser extension 112, browser extension 112 may be analyzed by a system administrator that is responsible for application server 118. The system administrator may decide to include browser extension 112 in browser extension repository 122 or, alternatively, remove the browser extension 112 from application server 118.

When path decoder 212 fails to determine a sensitive path in browser extension 112, browser extension 112 may be distributed to clients 106. Application server 118 stores browser extension 112 in browser extension repository 122 for access and download by clients 106.

In one embodiment, taint tracker 214 analyzes the source code using taint tracking. In taint tracking, taint tracker 214 invokes code parser 208 to identify tainted variables in the source code. For example, code parser 208 includes logic that identifies whether a variable receives and/or stores the personal and sensitive information of a user. When a variable receives personal and sensitive information of a user, the variable is tainted. An example tainted variable is a variable that receives the results of an exemplary functions, such as, "GetBrowerBookmarks( )" or "GetBrowserCookies( )."

In another embodiment, a tainted variable may be copied, replicated, or set to another variable. Once code parser 208 determines that the tainted variable was copied to a second variable, the second variable is also identified as a tainted variable. For example, in the source code below:
  var x=GetBrowerBookmarks( );
  //some source code
  var a=GetData( );
  var y=x+a;

In the example above, variable "x" is a tainted variable as it receives a listing of the user's bookmarks in the browser. Variable "y" is also a tainted variable as it is set, at least in part, to the data in variable "x." In an embodiment, code parser 208 determines the tainted variables by keeping track of the assignments. Example assignment is content that is assigned to a tainted variable. Another example assignment is when the tainted variable is assigned to other variables.

When taint tracker 214 completes identifying tainted variables in the source code, taint tracker 214 begins an elimination process. In the elimination process, taint tracker 214 eliminates the tainted variables that do not occur on the sensitive path. Those variables may be eliminated because even though they query the personal and sensitive information of a user, the information is not leaked over network 102.

To identify tainted variables that may be eliminated, taint tracker 214 traverses the sensitive path in the CFG and determines whether each tainted variable is included in the sensitive path. When the tainted variable is not included in the sensitive path, the personal and sensitive information of a user does not reach a sensitive end node, and thus is not leaked over network 102. The tainted variable that is not included in the sensitive path is eliminated. However, when the tainted variable is included in the sensitive path, taint tracker 214 stores the tainted variables in the subset of tainted variables. The elimination process thus generates a subset of tainted variables that are included in the sensitive path.

When a subset of tainted variables is generated, taint tracker 214 determines whether the variables in the subset are leaked to network 102. To determine the leakage, taint tracker 214 identifies the sensitive end nodes in the sensitive path. Taint tracker 214 then determines whether the tainted variables included in the subset exist in the sensitive end nodes. When tainted variables exist in the sensitive end nodes, browser extension 112 is identified to leak personal and sensitive information of a user. However, when the tainted variables in the generated subset do not exist in the sensitive end nodes, browser extension 112 is deemed safe for storage and distribution.

Figure 3:
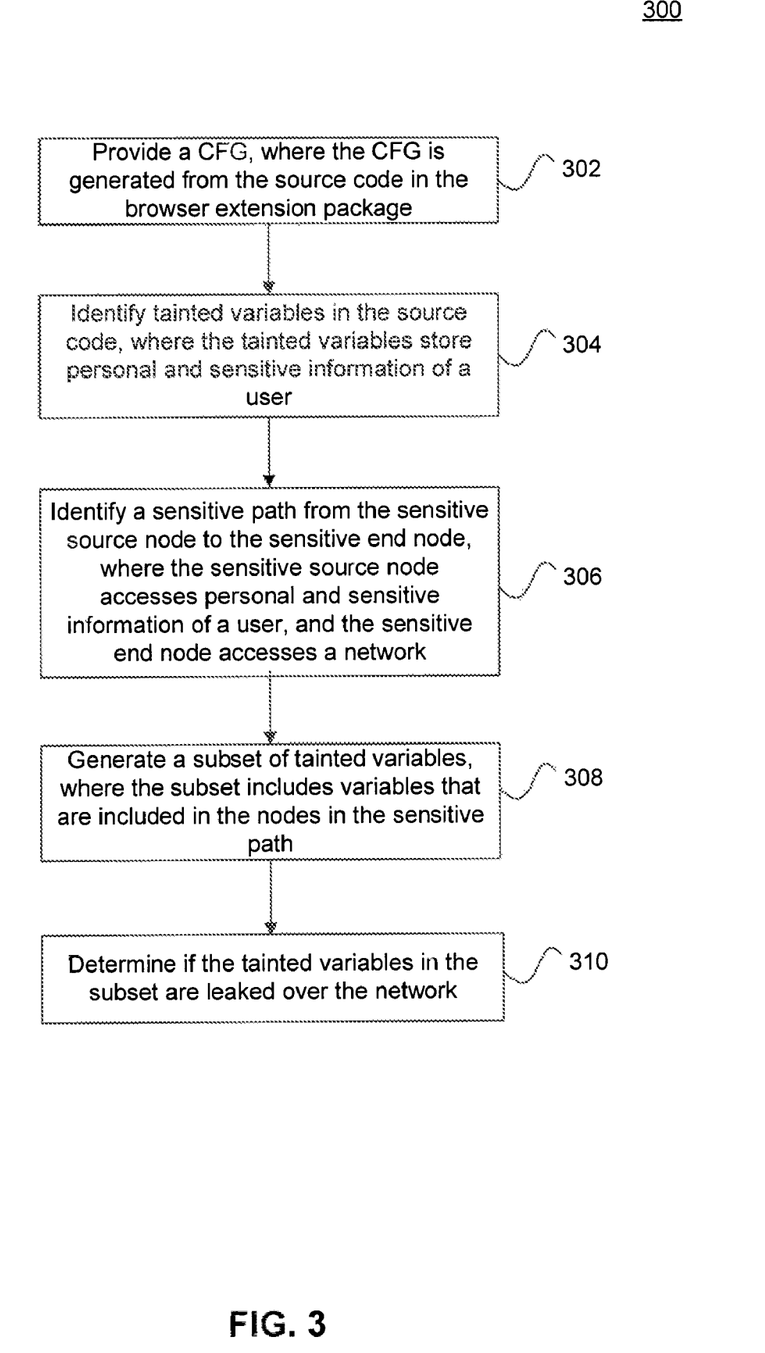
FIG. 3 is a flowchart of a method for identifying whether a browser extension leaks personal and sensitive information over a network, according to an embodiment.

FIG. 3 is a flowchart 300 of a method for identifying whether a browser extension leaks personal and sensitive information over a network, according to an embodiment.

At stage 302, a CFG is provided. As described herein, the CFG of a browser extension 112 may be generated from the source code that is included in the browser extension package. For example, code analyzer 204 may generate a CFG using code lexer 206, code parser 208, AST generator 209 and CFG generator 210.

At stage 304, tainted variables are identified. For example, lexer 206 identifies variables in the code source. Code parser 208 then identifies a set of tainted variables from the variables identified by lexer 206. As described herein, tainted variables store personal and sensitive information of a user. Example personal and sensitive information of a user is the browsing history of a user, browser bookmarks, or cookies, HTML forms, user preferences, saved passwords, user's keyboard or mouse movements, HTML data, URLs, etc. Code parser 208 also identifies tainted variable using assignment. For example, when a first tainted variable is assigned to a second variable, the second variable also becomes a tainted variable.

At stage 306, a sensitive path is identified. A sensitive path is a path that begins at a sensitive source node and ends at a sensitive end node. The sensitive source node is a node in the CFG that includes source code that accesses and retrieves personal or sensitive information of a user. The sensitive end node is a node that includes source code that implements an I/O interface and accesses network 102. Path decoder 212 identifies the sensitive source nodes and the sensitive end nodes. Once the sensitive source nodes and the sensitive end nodes are identified, path decoder 212 identifies a sensitive path from the identified sensitive source nodes to the identified sensitive end nodes.

At stage 308, a subset of tainted variables is generated. For example, taint tracker 214 uses an elimination process to eliminate tainted variables that do not occur in the sensitive path. Taint tracker 214 traverses the sensitive path of the CFG, and identifies whether tainted variables identified in stage 304 are included in each node in the sensitive path identified in stage 306. Tainted variables that do not occur in the sensitive path are eliminated as even though they query the personal and sensitive information of a user, the information is not leaked over network 102. Tainted variables that are included in the sensitive path are stored in the subset of tainted variables.

At stage 310 a determination is made as to whether the tainted variables in the subset generated in stage 308 are leaked over a network. In one embodiment, taint tracker 214 determines whether the tainted variables exist in the sensitive end nodes that access network 102. When tainted variables exist in the sensitive end nodes, browser extension 112 is identified as malicious. However, when the tainted variables in the subset of tainted variables do not exist in the sensitive end nodes, browser extension 112 is deemed safe for storage in browser extension repository 122 and distribution to clients 106. In an embodiment where extension analyzer 120 is installed on client 106 or computing device 114, browser extension 112 is deemed safe for installation on client 106 or computing device 114.

Figure 4:
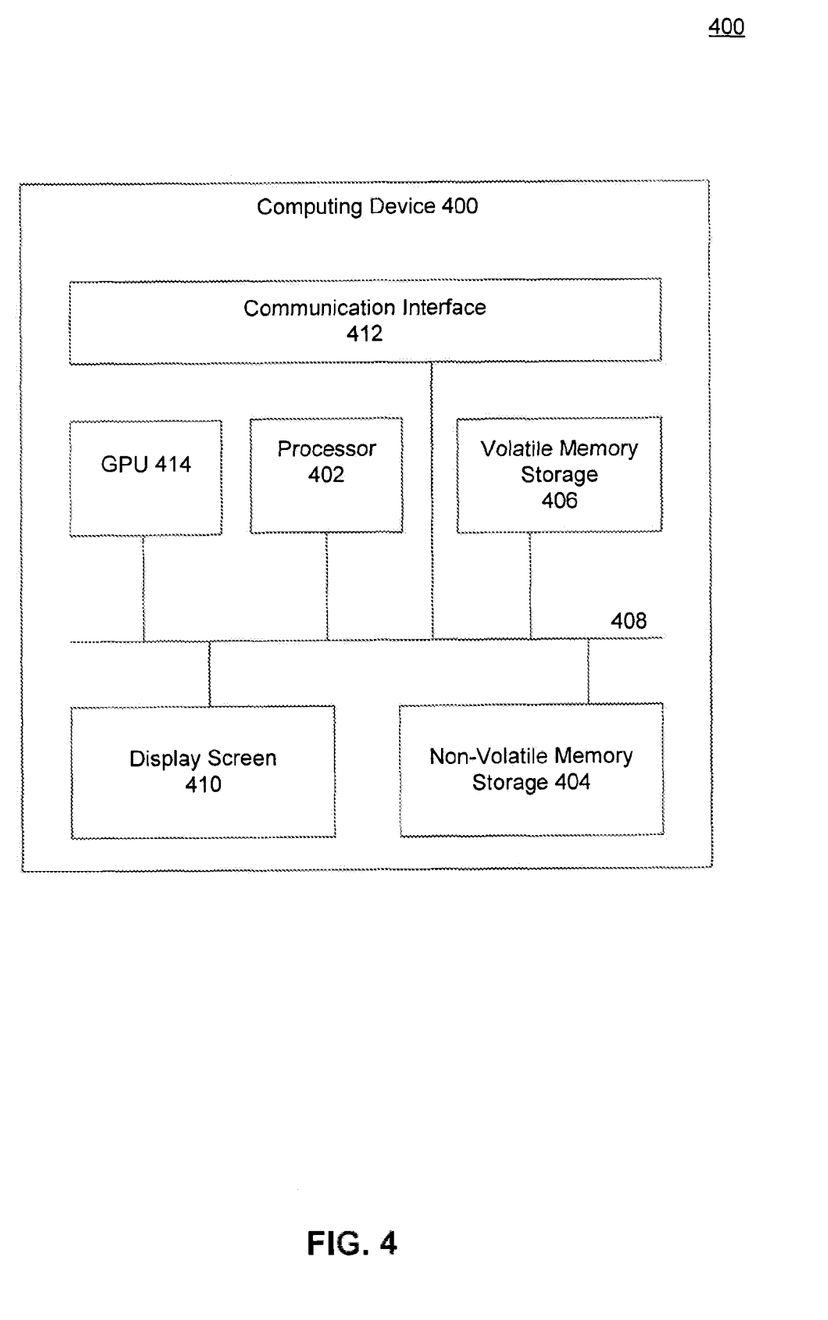
FIG. 4 is a block diagram of a computer system in which embodiments of the invention can be implemented.

FIG. 4 is an example computer system 400 in which embodiments of the present invention, or portions thereof, may be implemented as computer-readable code. For example, the components or modules of system 100, such as browser 110, browser extension 112, extension analyzer 120, and browser extension repository 122 may be implemented in one or more computer systems 400 using hardware, software, firmware, tangible computer-readable media having instructions stored thereon, or a combination thereof and may be implemented in one or more computer systems or other processing systems. Modules and components in FIGS. 1-4 may be embodied in hardware, software, or any combination thereof.

Client 106 or web server 104 may include one or more computing devices. Client 106 or web server 104 may include one or more processors 402, one or more non-volatile storage mediums 404, one or more memory devices 406, a communication infrastructure 408, a display screen 410 and a communication interface 412.

Processors 402 may include any conventional or special purpose processor, including, but not limited to, digital signal processor (DSP), field programmable gate array (FPGA), and application specific integrated circuit (ASIC).

GPU 414 is a specialized processor that executes instructions and programs, selected for complex graphics and mathematical operations, in parallel.

Non-volatile storage 404 may include one or more of a hard disk drive, flash memory, and like devices that may store computer program instructions and data on computer-readable media. One or more of non-volatile storage device 404 may be a removable storage device.

Memory devices 406 may include one or more volatile memory devices such as, but not limited to, random access memory. Communication infrastructure 408 may include one or more device interconnection buses such as Ethernet, Peripheral Component Interconnect (PCI), and the like.

Typically, computer instructions are executed using one or more processors 402 and one or more GPUs 414. Computer instructions can be stored in non-volatile storage medium 404 or memory devices 406. Computer instructions may be stored on a computing device in a compiled file, an executable file or a dynamically linked libraries or objects. Computer instructions may also be compiled on a computing device prior to execution or interpreted on the computing device. In a non-limiting example, computer instructions may be included in a routine, a subroutine, or layers of a software stack that are manipulated by processors 402 or GPUs 414.

Display screen 410 allows results of the computer operations to be displayed to a user or an application developer.

Communication interface 412 allows software and data to be transferred between computer system 400 and external devices. Communication interface 412 may include a modem, a network interface (such as an Ethernet card), a communications port, a PCMCIA slot and card, or the like. Software and data transferred via communication interface 412 may be in the form of signals, which may be electronic, electromagnetic, optical, or other signals capable of being received by communication interface 412. These signals may be provided to communication interface 412 via a communication path. The communications path carries signals and may be implemented using wire or cable, fiber optics, a phone line, a cellular phone link, an RF link or other communication channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for determining whether a browser extension leaks information over a network, comprising:

provides a control flow graph (CFG), the CFG generated from a source code included with the browser extension, wherein the source code that generates the CFG is in a scripting language;

determining, using a processor, a sensitive path in the CFG, the sensitive path beginning at a sensitive source node and ending at a sensitive end node;

identifying a set of tainted variables in the CFG, each tainted variable in the set storing sensitive information;

generating a subset of tainted variables, wherein each tainted variable in the subset is included in the sensitive path; and determining when at least one tainted variable in the subset of tainted variables is included in the sensitive end node, wherein the at least one tainted variable included in the sensitive end node is associated with a leak of sensitive information by the browser extension over the network.

2. The computer-implemented method of claim 1, wherein the scripting language is JavaScript.

3. The computer-implemented method of claim 1, further comprising determining the sensitive source node within a plurality of CFG nodes in the CFG, wherein the sensitive source node accesses sensitive information accessible by a computing device that executes the browser extension.

4. The computer-implemented method of claim 1, further comprising determining the sensitive end node within a plurality of CFG nodes in the CFG, wherein the sensitive end node accesses a network accessible by a computing device that executes the browser extension.

5. The computer-implemented method of claim 1, further comprising identifying a tainted variable when the tainted variable receives sensitive information.

6. The computer-implemented method of claim 1, further comprising identifying a tainted variable using assignment.

7. The computer-implemented method of claim 1, further comprising storing the browser extension for distribution when each tainted variable in the subset is excluded from the sensitive end node.

8. The computer-implemented method of claim 1, further comprising installing the browser extension on a computing device when each tainted variable in the subset is excluded from the sensitive end node.

9. The computer-implemented method of claim 1, further comprising determining the sensitive source node within a plurality of CFG nodes in the CFG, wherein the sensitive source node accesses personal information of a user on a computing device that executes the browser extension.

10. A system for determining whether a browser extension leaks information over a network, comprising:

a code analyzer configured to provide a control flow graph (CFG), the CFG generated from a source code included with the browser extension, wherein the source code that generates the CFG is in a scripting language;

a path decoder configured to determine a sensitive path in the CFG, the sensitive path beginning at a sensitive source node and ending at a sensitive end node;

a taint tracker configured to:
identify a set of tainted variables in the CFG, each tainted variable in the set storing sensitive information;
generate a subset of tainted variables, wherein each tainted variable in the subset is included in the sensitive path; and
determining when at least one tainted variable in the subset of tainted variables is included in the sensitive end node, wherein the at least one tainted variable included in the sensitive end node is associated with a leak of sensitive information by the browser extension over the network.

11. The system of claim 10, wherein the scripting language is JavaScript.

12. The system of claim 10, wherein the path decoder is configured to determine a sensitive source node within a plurality of CFG nodes in the CFG, wherein the sensitive source node accesses sensitive information accessible by a computing device that executes the browser extension.

13. The system of claim 10, wherein the path decoder is configured to determine the sensitive end node within a plurality of CFG nodes in the CFG, wherein the sensitive end node accesses the network accessible by a computing device that executes the browser extension.

14. The system of claim 10, further comprising a code parser configured to identify the tainted variable when the tainted variable receives sensitive information of the user.

15. The system of claim 10, further comprising a code parser configured to identify a tainted variable using assignment.

16. The system of claim 10, further comprising a browser extension repository configured to store the browser extension for distribution to a computing device when each tainted variable in the subset is excluded from sensitive end node.

17. The system of claim 10, further comprising a browser configured to install the browser extension on a computing device when each tainted variable in the subset is excluded from the sensitive end node.

18. The system of claim 10, further comprising determining a sensitive source node within a plurality of nodes in the CFG, wherein the sensitive source node accesses personal information of a user on a computing device that executes the browser extension.

19. An article of manufacture including a non-transitory computer-readable medium having instructions retrieved thereon that, when executed by a computing device, cause the computing device to perform operations for determining whether a browser extension leaks information over a network, the operations comprising:

providing a control flow graph (CFG), the CFG generated from a source code included with the browser extension, wherein the source code that generates the CFG is in a scripting language;

determining, a sensitive path in the CFG, the sensitive path beginning at a sensitive source node and ending at a sensitive end node;

identifying a set of tainted variables in the CFG, each tainted variable in the set storing sensitive information;

generating a subset of tainted variables, wherein each tainted variable in the subset is included in the sensitive path; and determining when at least one tainted variable in the subset of tainted variables is included in the sensitive end node, wherein the at least one tainted variable included in the sensitive end node is associated with a leak of sensitive information by the browser extension over the network.

20. The computer-readable medium of claim 19, wherein the instructions further cause the computing device to perform operations comprising:

determining a sensitive source node within a plurality of nodes in the CFG, wherein the sensitive source node accesses sensitive information accessible by a computing device that executes the browser extension.

* * * * *